(No Model.)
C. J. T. BURCEY.
WOOD DISTILLING APPARATUS.
No. 275,461. Patented Apr. 10, 1883.
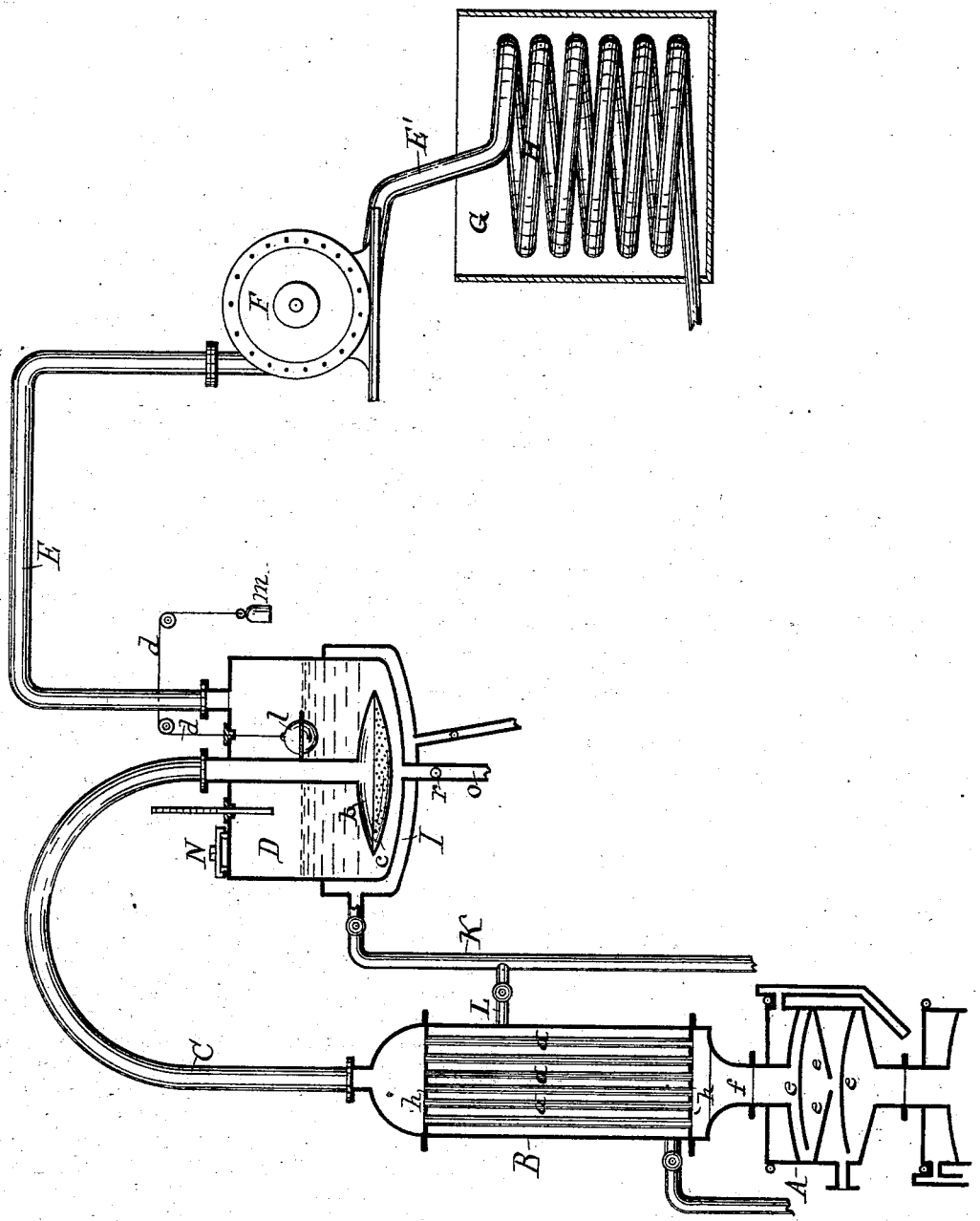
Witnesses
Wm. C. Raymond
T. H. Gibbs
Inventor
Charles J. T. Burcey
per Duell, Laass & Hey
his Attys

UNITED STATES PATENT OFFICE.

CHARLES J. T. BURCEY, OF SYRACUSE, NEW YORK.

WOOD-DISTILLING APPARATUS.

SPECIFICATION forming part of Letters Patent No. 275,461, dated April 10, 1883.

Application filed September 27, 1882. (No model.)

*To all whom it may concern:*

Be it known that I, CHARLES J. T. BURCEY, of Syracuse, in the county of Onondaga, in the State of New York, have invented new and useful Improvements in Wood-Distilling Apparatus, of which the following, taken in connection with the accompanying drawing, is a full, clear, and exact description.

This invention consists in the novel means of deodorizing wood-alcohol, as hereinafter fully described, and specifically set forth in the claims.

The annexed drawing represents an elevation of my invention, shown partly in section to better illustrate the internal arrangement of some of its constituent parts.

A represents the top portion of a wood-alcohol distilling apparatus, the heavier products of distillation being separated from the vaporous alcohol by deflecting-plates e e, arranged inside of said distilling apparatus, and the lighter or more volatile portion of the alcohol passing upward through the top opening, f, from whence they have hitherto been conveyed to suitable condensers. Instead of immediately condensing the said alcohol, I pass it into a reheating apparatus, B, in the form of a steam drum or cylinder, mounted on top of the distilling apparatus A, and having at a proper distance from its ends two diaphragms or flue-sheets, h h, to which is connected a series of flues, a a, extended longitudinally through said drum and open at their extremities, the lower end of said flues being thus made to communicate with the subjacent distilling apparatus A.

To the upper end of the steam-drum B is connected a pipe, C, which is extended into a tank, D, through the top thereof and terminated near the bottom of the same. This tank is made air-tight and provided on top with a suitable inlet, N, through which to introduce soluble glass, or a solution of silicate of potash or silicate of soda, formed of 22 parts of silica, 13.5 parts of soda, and 64.5 parts of water, giving a soluble glass of a density of 1.25 to 1.28. An outlet, o, provided with a stop-cock, r, is connected to the bottom of the tank D for emptying the same when desired.

To the discharge end of the pipe C, I connect two concavo-convex disks, b c, with their concave sides facing each other and joined at their edges. The bottom disk, c, is perforated, and, in conjunction with the upper disk, b, serves to thorougly diffuse the vapor alcohol passing from the pipe C through the perforations of the disk c. The bottom of the lower portion of the vertical sides of the tank D is surrounded by a steam-jacket, I, which receives steam from a pipe, K, connected with a suitable steam-generator. A branch pipe, L, extended from the steam-pipe K and tapping the drum B, between the two flue-sheets h h, conveys steam to said drum for reheating the alcohol passing through the flues a a of said drum. From the top of the tank D is extended a pipe, E, which communicates with the induction-port of the exhaust-fan F. From the discharge-opening of the fan F is extended a pipe, E', which is connected with a coil-pipe, H, situated in a water-tank or condensing-vat, G, the extremity of said coil passing out through the side of the vat G and delivering the alcohol in a condensed and deodorized state.

$l$ denotes a float placed inside of the receptacle D and having a cord or light chain, d, extended through the top of said receptacle and over pulleys, and provided on its end with a sufficient weight, m, to maintain the cord or chain taut, said float having the requisite buoyancy and weight to rise and fall with the soluble glass in the tank D, and, by the corresponding rise and fall of the weight m, indicating the depth of the soluble glass in the tank.

The operation of the described apparatus is as follows: The tank D is to be partly filled with soluble glass, then the distilling apparatus A being set in operation the light and vaporous products of distillation ascend therefrom and pass through the flues a a of the steam-drum B, and thence through the pipe C to the tank D. The discharge end of the pipe C, being submerged in the soluble glass, compels the vapor as it issues from the pipe C to pass through said soluble glass to the space above it. The deflector b, in conjunction with the strainer c, serves to diffuse the vapor in its passage through the bath of soluble glass. The flow of the vapor is accelerated by reheating the vapor to about 66° centigrade in the steam-drum B, and to about 70° centigrade in the tank D. This is accomplished by turning on the steam through the pipes K and L. From the tank D the vapor is drawn through the pipe E by the fan F, which forces it through the condensing-coil H. The suction of the fan produces a vacuum in the upper part of the tank, and thus facilitates the circulation of the vapor through the bath of soluble glass. This bath effectually deodorizes the wood-alcohol.

Having described my invention, what I claim is—

1. The combination, with the distilling apparatus A, of the steam-drum B, having flues $a\ a$, communicating with said apparatus, the tank D, pipe $c$, terminating near the bottom of said tank, pipe E, fan F, and condenser G, substantially as and for the purpose set forth.

2. In combination with a wood-alcohol distilling apparatus, the reheater B, pipe C, soluble glass tank D, steam-jacket I, steam-pipes K L, pipe E, fan F, coil H, and tank G, all as described and shown, for the purpose specified.

In testimony whereof I have hereunto signed my name and affixed my seal, in the presence of two attesting witnesses, at Syracuse, in the county of Onondaga, in the State of New York, this 13th day of September, 1881.

CHARLES J. T. BURCEY. [L. S.]

Witnesses:
WM. C. RAYMOND,
FRED. H. GIBBS.